United States Patent [19]

Principe

[11] Patent Number: 4,765,578

[45] Date of Patent: Aug. 23, 1988

[54] STAMPED SUSPENSION BAND

[75] Inventor: Viktor Principe, Romanshorn, Switzerland

[73] Assignee: Arthur Schmid AG, Switzerland

[21] Appl. No.: 936,290

[22] Filed: Nov. 28, 1986

[51] Int. Cl.⁴ .............................................. F16L 3/14
[52] U.S. Cl. ..................................................... 248/59
[58] Field of Search ....................... 248/58, 59, 60, 62, 248/74.3, 231, 327, 328; 24/274 R, 274 WB, 278, 22, 23 R

[56] References Cited

U.S. PATENT DOCUMENTS

| D. 230,951 | 3/1974 | Marchese | 24/274 R |
|---|---|---|---|
| 403,178 | 5/1889 | Cary | 24/22 |
| 2,689,998 | 9/1954 | O'Shei | 24/274 R |
| 3,078,532 | 2/1963 | Bywater | 24/22 |

FOREIGN PATENT DOCUMENTS

| 408905 | 9/1966 | Australia | 248/59 |
|---|---|---|---|
| 1284741 | 12/1968 | Fed. Rep. of Germany | 248/59 |
| 435881 | 10/1967 | Switzerland . | |
| 608287 | 12/1978 | Switzerland . | |

Primary Examiner—J. Franklin Foss
Assistant Examiner—Robert A. Olson
Attorney, Agent, or Firm—Thomas W. Speckman; Ann W. Speckman

[57] ABSTRACT

A band for encircling a stationary body and an object to be suspended, the band having a plurality of impressions forming elevations on a front side and depressions on a rear side, each elevation having an inclined external wall forming a smooth rounded transition with the front side to a perpendicular external wall extending perpendicularly to the surface of the front side to a parallel surface extending substantially parallel to the front side and having a central trough, each depression having an inner perpendicular wall extending perpendicularly from the rear side forming a smooth rounded transition into an inclined internal wall which forms a smooth rounded transition into a trough surrounding an elevated base formed by material displacement of the central trough, the perpendicular external wall and the inner perpendicular wall so dimensioned as to fit in a tightly locking manner with one another.

4 Claims, 1 Drawing Sheet

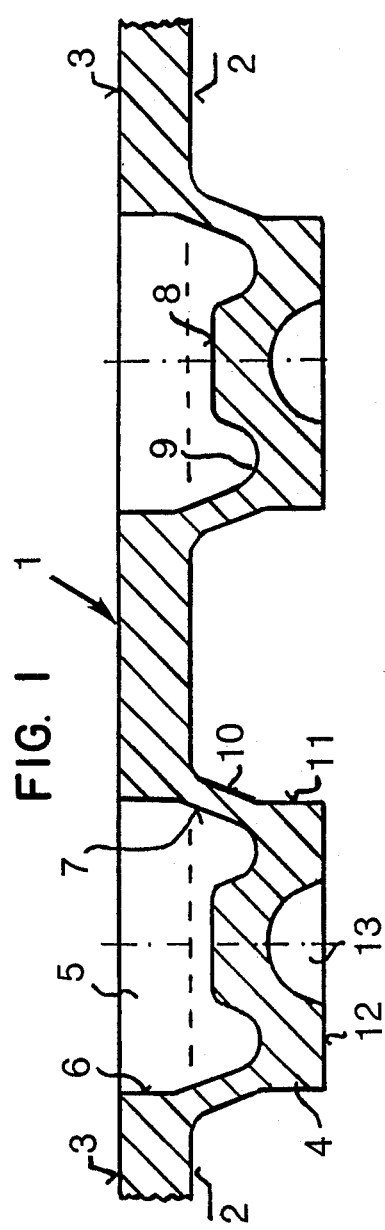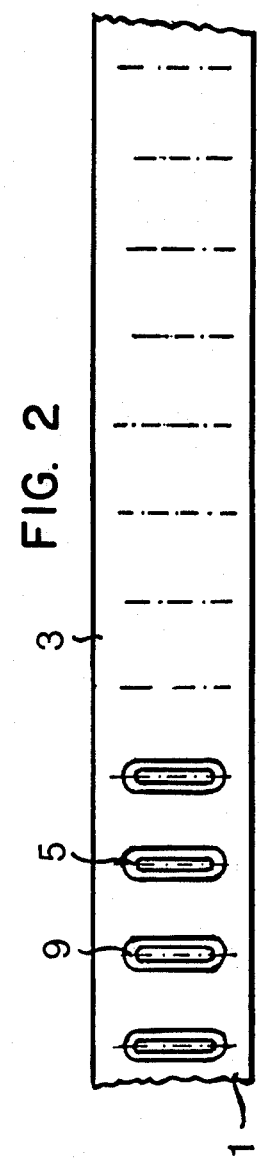

STAMPED SUSPENSION BAND

BACKGROUND OF THE INVENTION

1. Field of the Invention

The present invention concerns a band, which is in particular looped around a stationary body and around an object to be suspended, which is provided with a series of impressions spaced at uniform distances from each other, which appear on the front side of the band as elevations, and on the rear side as depressions, whereby the elevations have a part with an external wall extending perpendicularly to the surface of the band, and the depressions, on the rear side of the band, have a part with an internal wall extending perpendicularly to the surface of the band, in such a way that all the parts of the elevations which are oriented perpendicularly to the surface of the band fit in a form-locking manner into the parts of the depressions which are oriented perpendicularly to the surface of the band.

In particular, the band serves for the suspension of pipes, cables (which are laid down, for example, in a U-shaped channel), air conduits, and underslung surfaces.

2. Description of the Prior Art

Different bands which are specially formed for such purposes, such as, for example, perforated bands and bands which are provided with impressions, are already known. Perforated bands have the disadvantage that they are weakened by the perforation. There are different types of bands which are provided with impressions; for example, such as have the impressions formed so that they can slide over one another in a ratchet-like manner. Bands of this type serve for drawing bundles or bales together. They are less well suited for purposes of suspension. Furthermore, bands are known which are only provided on the ends with impressions with a different form. Such bands are, however, unsuitable for purposes of suspension.

One known type of suspension band taught by Swiss Pat. No. 435,881 is provided with a stamped serration extending over the entire length of the band, which is so shaped that the elevations on the forward side of the band can engage in a form-locking manner into the depressions on the rear side of the band. When using this band for purposes of suspension, the overlapping band ends must be held together by means of a coupling unit. The sides of the stamped serration do extend relatively steeply, but are not perpendicular to the surface of the band. The traction force acting in the longitudinal direction of the band is transferred from one end of the band to the other end of the band with the aid of the serration. Because of the inclination of the serration surfaces of the surface of the band, there arises a component which proceeds perpendicularly to the surface of the band, which has the tendency to loosen the form-locking connection. This force component requires a solid coupling so that it can hold the ends of the band together. The stamped serration proceeding laterally to the band extends over a considerable portion of the width. Through this, not only is the tensile strength of the band reduced, but the stamping also has a consequence that the band easily breaks during severe bendings.

These problems were solved by the band of the applicant in accordance with Swiss Pat. No. 608,287, and this band has indeed proven itself in actual practice. However, its manufacture has presented a number of problems. In particular, the shoulder in the elevations and depressions led to a materials flow, which led to structural changes in the crystal lattice of the metal, which in turn caused brittleness. This further led to cracks or to hair-line cracks, and thus to losses in production.

SUMMARY OF THE INVENTION

Numerous experiments have demonstrated that this problem in production can be solved by means of a number of small structural changes. The problem can be solved through the fact that conically oriented wall portions connect to the wall portions oriented vertically to the surface of the band, and that, in the surface of the elevation, a material displacement trough is impressed.

BRIEF DESCRIPTION OF THE DRAWINGS

One embodiment of the object of the invention is depicted in the diagram. This illustrates the following:

FIG. 1 is a portion of the band in longitudinal cross section, on an enlarged scale; and FIG. 2 is a view from above the band.

DESCRIPTION OF PREFERRED EMBODIMENTS

The suspension band is formed by roll stamping from a flat band (1) with a width of approximately 2 cm. The front side of the band is designated by (2), and the rear side of the band is designated by (3). The terms front side of the band and rear side of the band have no effective significance regarding applications or manufacture, but serve only for the purpose of definition in the description and the claims. The elevations (4) formed on the front side of the band (2) by stamping appear on the rear side of the band as depressions (5). In the cross-sectional view which corrresponds to the longitudinal section of the band, the depressions have one part which extends to the surface of the rear side of the band (3) with lateral walls (6) which extend perpendicularly to the surface of the band. There then follows a part (7) which extends conically toward the lowest point of the depression (5). A sharp transition from the vertical side walls (6) to the inclined walls (7) of the depression is thereby avoided. The base (8) of the depression (5) further extends at least approximately parallel to the surface of the band (1). The base (8) is bordered by a rounded groove (9), which essentially serves for materials displacement and for increasing solidity.

The elevations (4) on the front side (2) of the band (1) are, of course, similar to the depressions on the rear side, but do not simply correspond to the complementary form. From the band surface of the front side (2), there first extends an enclosing, inclined wall (10), which corresponds to the inclination of the wall part (7), an there then follows a part (11) in which the walls again extend precisely perpendicular to the surface of the band. The remaining surface (12) of the elevation in turn extends roughly parallel to the surface of the band, in which an approximately centric materials displacement trough (13) is impressed. The formation of a sharp transition is also prevented here as well. The part of the elevation (4) which has a wall part extending perpendicularly to the surface of the band is not larger than that part of the depression (5), which likewise has a wall part (6) extending perpendicularly to the surface of the band. In using the band, at least one loop, as already described, is formed, in which at least one end of the band of the loop overlaps the band, or both ends of the band overlap one another, and the elevations stand in form-locking contact with the depressions. In this, the wall parts lie directly adjacent one another, and permit the forces proceeding in the longitudinal direction of the band to be transferred optimally. The shape of the elevation can be chosen more or less as desired, as long as the course of the walls is stamped corresponding to the prescribed form. Thus, the elevations and depressions can have a round or an extended form, as FIG. 2 shows.

I claim:

1. In a suspension band for encircling a stationary body and an object to be suspended, of the type provided with a plurality of impressions spaced at uniform distances from one another, said impressions forming elevations (4) on a front side (2) of said suspension band (1) and forming depressions (5) on a rear side (3) of said suspension band (1), the improvement comprising: each said elevation (4) comprising an inclined external wall (10) forming a smooth rounded transition with said front side (2) to a perpendicular external wall (11) extending perpendicularly to the surface of said front side (2), each said elevation (4) having a parallel surface (12) extending substantially parallel to said front side (2), said parallel surface (12) having a central trough (13); each said depression (5) comprising an inner perpendicular wall (6) extending perpendicularly from said rear side (3) forming a smooth rounded transition into an inclined internal wall (7), said inclined internal wall (7) forming a smooth rounded transition into a surrounding trough (9) surrounding an elevated base (8) formed by material displacement of said central trough (13), said perpendicular external wall (11) and said inner perpendicular wall (6) so dimensioned as to fit in a tightly locking manner with one another.

2. In a suspension band in accordance with claim 9, the additional improvement comprising said base (8) extending substantially parallel to the surface of said rear side (3).

3. A suspension band in accordance with claim 1, wherein said band has a width of about 2 cm.

4. A suspension band in accordance with claim 1, wherein said elevations (4) and said depressions (5) have an elongated form.

* * * * *